US008913595B2

(12) United States Patent
Bruce et al.

(10) Patent No.: US 8,913,595 B2
(45) Date of Patent: Dec. 16, 2014

(54) APPARATUS AND METHOD FOR ENRICHING DATA RECORDS IN A TELECOMMUNICATIONS NETWORK

(75) Inventors: Andrew Bruce, Edinburgh (GB); Richard Beattie, Edinburgh (GB); Cameron Kane, Glasgow (GB); James Galloway, Perth (GB)

(73) Assignee: JDS Uniphase Corporation, Milpitas, CA (US)

( * ) Notice: Subject to any disclaimer, the term of this patent is extended or adjusted under 35 U.S.C. 154(b) by 2234 days.

(21) Appl. No.: 11/490,447

(22) Filed: Jul. 20, 2006

(65) Prior Publication Data
US 2007/0171856 A1 Jul. 26, 2007

(30) Foreign Application Priority Data

Jul. 25, 2005 (GB) .................................. 0515106.3

(51) Int. Cl.
*H04M 3/42* (2006.01)
*H04M 1/00* (2006.01)
(Continued)

(52) U.S. Cl.
CPC ............... *H04W 24/08* (2013.01); *H04L 43/18* (2013.01); *H04L 43/00* (2013.01);
(Continued)

(58) Field of Classification Search
CPC ... H04L 63/10; H04L 67/306; H04L 41/5003; H04L 41/5025; H04L 47/2408; H04L 12/66; H04L 67/22; H04L 12/1417; H04L 12/2825; H04L 2012/2841; H04M 15/00; H04M 15/58; H04M 2215/0188; H04M 15/41; H04M 15/765; H04M 3/2281; H04M 15/28; H04M 15/30; H04M 15/31; H04M 15/43; H04M 15/44; H04M 15/53; H04M 15/66; H04M 15/75; H04M 15/752; H04M 15/7652; H04M 15/80; H04W 4/24; H04W 4/26; H04W 12/08; H04W 28/02; H04W 4/001; H04W 8/02; H04W 24/00; H04W 24/02; H04W 12/12; H04W 24/04

USPC .......... 455/410, 456, 432.1, 435.1, 432–436, 455/415, 550.1; 370/338, 320, 328–335; 379/88.19–88.21, 112.01, 379/121.02–121.06, 126, 127.01, 133, 379/142.06

See application file for complete search history.

(56) References Cited

U.S. PATENT DOCUMENTS 6,400,939 B1 * 6/2002 Virtanen et al. ............... 455/410
7,155,205 B2 * 12/2006 Cerami et al. ................ 455/406

(Continued)

FOREIGN PATENT DOCUMENTS

| AU | A-69005/98 | 5/1995 |
| EP | 1 331 833 A1 | 1/2003 |
| EP | 1331833 A1 * | 7/2003 |

OTHER PUBLICATIONS

GB Search Report dated Dec. 12, 2005.

Primary Examiner — Nizar Sivji
(74) Attorney, Agent, or Firm — JDS Uniphase Corporation

(57) ABSTRACT

An apparatus for enriching data records based on messages monitored on a telecommunications network having an Internet Protocol (IP) portion includes a data record enrichment module for receiving data records from a data record builder. The data records include at least a subscriber identifier field and a handset type identifier field and the data enrichment module stores a table mapping subscriber identifiers with the handset type identifiers. When a received data record includes a subscriber identifier and a handset type identifier, the table is updated appropriately and when the received data record includes the subscriber identifier but does not include the handset type identifier, the data record enrichment module checks the table for the handset type identifier mapped to the subscriber identifier and adds the corresponding handset type identifier, if it is present in the table, to the handset type identifier field in the data record.

17 Claims, 3 Drawing Sheets

(51) Int. Cl.
*H04W 4/00* (2009.01)
*H04B 7/216* (2006.01)
*H04W 24/08* (2009.01)
*H04L 12/26* (2006.01)

(52) U.S. Cl.
CPC ............ *H04L 12/2602* (2013.01); *H04L 43/12* (2013.01)
USPC ........ 370/338; 455/415; 455/550.1; 370/328; 370/335

(56) References Cited

U.S. PATENT DOCUMENTS

| | | | |
|---|---|---|---|
| 7,190,959 B2 * | 3/2007 | Palmer et al. | 455/445 |
| 2002/0120873 A1 | 8/2002 | Salmivalli | |
| 2003/0076936 A1 * | 4/2003 | Locke et al. | 379/112.01 |
| 2005/0153741 A1 | 7/2005 | Chen et al. | |
| 2005/0239504 A1 * | 10/2005 | Ishii et al. | 455/558 |

* cited by examiner

APPARATUS AND METHOD FOR ENRICHING DATA RECORDS IN A TELECOMMUNICATIONS NETWORK

This invention relates to an apparatus and method for enriching data records in a telecommunications network, particularly, though not exclusively, to an apparatus and method for enriching call data records with handset information.

BACKGROUND

In modern switched telecommunications systems (in particular, modern Public Switched Telephone Networks (PSTNs) and Public Land Mobile Networks (PLMNs)) it has become common practice to provide two related but separate network infrastructures: a bearer or transmission network for carrying end-user voice and data traffic, and a signaling network for controlling the setup and release of bearer channels through the bearer network in accordance with control signals transferred through the signaling network (sometimes known as out-of-band signaling). In practice, such signaling networks comprise high-speed computers interconnected by signaling links; computer programs control the computers to provide a set of operational and signaling functions in accordance with a standardised protocol.

One example of such a signaling protocol is the Signaling System No. 7 (SS7), whether as specified by the CCITT, ANSI, ETSI (for GSM), Bellcore or similar body, such a network being herein referred to as an SS7 network. Another known signaling protocol is the General Packet Radio Service Tunneling Protocol (GTP) used in the General Packet Radio Service (GPRS), such as is used for GSM data traffic. As is known in connection with such networks, signaling information is passed over the signaling links to carry out particular signaling conversation, or transaction. Any particular transaction requires a number of messages to be sent between two nodes in the network (endpoints of the transaction). A transaction can either carry out a procedure, such as to create a context identifier, or for hand-off control, or can request information, for example, to provide capability information. A context is a unique transaction between two end nodes that can be identified by a context identifier included in all messages relating to that transaction.

Both the SS7 and the GPRS signaling protocols belong to a class of signaling protocols characterised as consisting of a number of call models (transactions) built from a subset of messages defined by the protocol. Some of the signaling protocols in this class can be distinguished in that the messages in a call model utilise a single transactional key to uniquely identify a message belonging to the same context between the end points involved in the transaction. For example in the single key SS7 protocol the key is often a machine generated 32 bit number, whereas the GPRS Tunneling Protocol (GTP) uses the GSM IMSI identifier plus one further digit to provide some 16 possible different contexts for a single IMSI. Of course, individual protocols have different rules for re-transmission of messages during a transaction and the conditions that must be met in order to declare a transaction as being completed successfully, completed with an error, or timed out (abandoned).

GPRS is a service that provides wireless packet data access to mobile GSM (Global System for Mobile Telecommunications) users. GPRS provides the first implementation of a packet switching technology within GSM, which is, itself, a circuit switched technology. GPRS is also an important precursor for 3G ($3^{rd}$ Generation Mobile Technology) as it implements the packet switched core required for UMTS (Universal Mobile Telecommunications System) networks. Data rates in the order of 115 kb/s can be supported.

A reference model for a GPRS network, as known in the art, is depicted in FIG. 1. GPRS allows a Mobile Station (MS) 11 to send and receive data in an end-to-end "packet transfer" mode, without using any network resources in "circuit-switched" mode. This allows for autonomous operation of GPRS and best fits the bursty traffic characteristics. Packet routing is supported by definition of a new logical network node called a GPRS support node (GSN). The GSN is basically a packet router with additional mobility management features and connects with various network elements through standardized interfaces. The GSN node that acts as a physical interface to external Public Data Networks (PDN's) 20, such as operator networks, corporate networks, or the Internet, is known as a Gateway GSN (GGSN) 21. The GSN node that connects with a BSC (Base Station Controller) 14 and directly handles packet delivery to and from MS's 11 is known as a Serving GSN (SGSN) 15.

Each SGSN 15 is responsible for the delivery of packets to the MS's 11 within its service area 10. The BSC 14 is the network entity controlling a number of BTS's (Base Transceiver Stations) 13, which are the network entities which communicate with the MS 11 via an antenna base station (not shown in FIG. 1).

An SGSN 15 provides a connection point for subscribers when they want to access services provided by the GPRS network 22. The SGSN 15 downloads the capabilities of the connecting MS 11 from a HLR (Home Location Register) 17, along with information such as security, billing and authentication etc. The HLR 17 is a database within the GSM network 22 which stores all the subscriber-specific data. An IMSI (International Mobile Subscriber Identity) is used to uniquely identify each MS 11 in the GPRS network 22.

Before an MS 11 is capable of using a GPRS service, it must attach to an SGSN 15. Effectively, this attachment corresponds to the establishment of a logical link between the MS 11 and its SGSN 15. The SGSN 15 encapsulates the data packets from the MS 11 and routes them to the appropriate GGSN 21, where they are forwarded to a fixed host inside the correct PDN 20. Specific routing policies are applied inside this PDN 20 to send the packets to the corresponding fixed host; these are known as "routing contexts". After attachment, one or more routing contexts for one or more network protocols can be negotiated with the SGSN 15.

Packets coming from a corresponding fixed host to an MS 11 are first routed to the GGSN 21 through the PDN 20, based on the examination of the destination address. The GGSN 21 checks the routing context associated with this destination address and determines the address of the SGSN 15 currently serving the addressed MS 11. Subsequently, the original data packet is encapsulated into another packet (this procedure is called tunneling), which is forwarded to the SGSN 15 and ultimately delivered to the correct MS 11.

In order to verify that a given MS 11 is allowed to use a network protocol, the HLR 17 is queried. Among other things, the subscription profile found in the HLR 17 includes the matching GGSN 21 address. If access is permitted, the GGSN 21 is requested to update the routing context (i.e. the SGSN 15 address and tunneling information) accordingly.

The GPRS backbone network (as defined by links Gn, Gp, and Gi in FIG. 1) is a private IP (Internet Protocol) network. The IP addresses used in this part of the backbone network are selected by the GPRS operator and they are not known outside the backbone network.

Also shown in FIG. 1 is an MSC (Mobile Switching Centre) 16, which is the switching centre of a mobile phone network, a GRX (GPRS Roaming Exchange) 18, which is a point of connection to other GPRS networks, as well as the various links having reference names, as listed below:

A is an interface between the BSC 14 and the MSC 16;

Abis is an interface between the BSC 14 and the BTS 13 (this can be proprietary if the BSC and the BTS are from the same NEM (Network Equipment Manufacturer), which is often the case);

Gb is an interface between the GGSN 21 and the BSC 14, which is likely to be implemented using Frame Relay;

Gi is an interface between the GGSN 21 and the PDNs 20, which is likely to be implemented using IP;

Gn is an interface between the GGSN 21 and the SGSN 15, which is likely to be implemented using IP;

Gp is an interface between the GGSN/SGSN 21, 15 and the GRX 18, which is likely to be implemented using IP;

Gr is an interface between the SGSN 15 and the HLR 17, which is likely to be implemented using SS7 (Signaling System 7); and Gs is an interface between the SGSN 15 and the MSC 16.

A transaction, as known in the art, is a related exchange between two network elements, for example a transaction could contain all packets that constitute a "GPRS location update" (which occurs when a mobile subscriber moves from one cell to another), or all the messages to do with a MS 11 attaching to the packet-switched network (such as GPRS Attach Request, Attach complete, Create PDP Context Request, Create PDP Context Complete etc). A transaction builder, also as known in the art, uses knowledge of the protocols used in the network (such as the GPRS protocols) to build a plurality of individual traffic messages into a complete transaction.

In order to analyse a network's operation to determine whether it is operating efficiently, it is known to analyse individual messages to determine the quality of service according to whether the messages are delayed, require retransmission, etc. However, in order to fully determine the health of a network, it is necessary not only to consider each individual message, but also to look at a complete conversation, or transaction, which requires that all context information be available for the analysis. For example, although within a context each of the messages may be transmitted efficiently and correctly, one or more of the messages, while correct in themselves, may mean that the transaction has failed if the message states that, for example, the password is incorrect, or that an address was entered incorrectly or that a node was temporarily unavailable. In such cases, knowledge of the complete transaction that failed may allow the failures to be analysed so that the functionality of the network can be improved.

As is known in connection with SS7 networks, signaling information is passed over the signaling links. In particular, the signaling information is used by a CDR Builder to generate a Call Detail Record (CDR) which can later be analyzed. For example, the CDRs can be analyzed by reference to a particular customer of a telecommunications company (telco) operating the SS7 system, or certain types of data can be mined from Call Detail Records maintained by telcos in billing databases, for example various types of commercial information.

The CDRs may be generated by an apparatus, such as the product developed by Agilent Technologies and known as "acceSS7". This apparatus consists of a CDR Builder, a CDR Agent and a Data Management Component (DMC). The CDR Builder monitors the signaling channels of the SS7 network and generates the CDRs, which are then passed via the CDR Agent to the DMC, where they are processed and correlated to provide a database of the records that can be viewed by interested parties, for example, telcos.

Service Usage Records (SUR) may be generated in respect of data or other types of call, rather than CDRs and both SURs and CDRs are sometimes known collectively as Transaction Data Records (TDRs).

As will be clear from the above discussion, however, generation of TDRs for analysis is not limited to SS7 systems and also occurs on other networks, such as UMTS. In cases where the messages on the network being monitored may be formatted in a variety of different protocols, the TDR Builder, not only has to monitor the messages, but must be able to differentiate between different protocols in order to generate the TDRs. Thus, in some cases, such an entity would include (and may be called) a Protocol Analyzer.

Nevertheless, TDRs do not always include all the information that may be desirable for a network operator to be able to determine how customers are using the network and the services in order to be able to improve them. For example, service providers would often like to know which handset types, as opposed to subscriber identity, and what content type their customers are most frequently using. Handset type is provided by the International Mobile Equipment Identity (IMEI) associated with each handset, but the IMEI information is not available over the IP user links forming the GPRS backbone. It would therefore be useful, if TDRs could be enhanced to provide at least handset type information.

SUMMARY OF THE DISCLOSED EMBODIMENTS

The present invention therefore seeks to provide a method and apparatus for enriching data records, which overcomes, or at least reduces the above-mentioned problems of the prior art.

Accordingly, in a first aspect, the invention provides an apparatus for enriching data records based on messages monitored on a telecommunications network having an Internet Protocol (IP) portion, the apparatus comprising a data record enrichment module having an input for receiving data records based on messages monitored on the IP portion of the network, the data records including at least a subscriber identifier field and another information field, the data enrichment module including a memory for storing a table mapping subscriber identifiers with the other information, and a processor for checking whether a received data record includes a subscriber identifier and the other information, wherein, if the received data record includes both the subscriber identifier and the other information, the processor creates or updates a mapping between them in the table, and, if the received data record includes the subscriber identifier but does not include the other information, the processor checks the table for the other information mapped to the subscriber identifier and adds the corresponding other information, if it is present in the table, to the other information field in the data record.

Each mapping of a subscriber identifier with the other information may include information as to when the mapping was created or updated and the processor may delete any mappings that are older than a predetermined value.

The table may be created with a plurality of predetermined mappings between subscriber identifiers and handset type identifiers.

In one embodiment of the invention, there is provided a system for generating data records based on communications within an Internet Protocol (IP) portion of a telecommunications network, the system comprising at least one probe for monitoring messages in the IP portion of the telecommunications network, a data record builder coupled to the at least one probe for building data records based on the monitored messages, and an apparatus for enriching data records as described above coupled to the data record builder.

The system may further comprise a non-volatile storage for storing the data records. The at least one probe may be located on a Gn link of a General Packet Radio Service (GPRS) telecommunications network.

According to a second aspect, the invention provides a method of enriching data records based on messages monitored on a telecommunications network having an Internet Protocol (IP) portion, the method comprising: receiving data records based on messages monitored on the IP portion of the network, the data records including at least a subscriber identifier field and another information field, storing a table mapping subscriber identifiers with handset type identifiers, checking whether a received data record includes a subscriber identifier and the other information, if the received data record includes both the subscriber identifier and the other information, creating or updating a mapping between them in the table, if the received data record includes the subscriber identifier but does not include the other information, checking the table for the other information mapped to the subscriber identifier and adding the corresponding other information, if it is present in the table, to the other information field in the data record, and storing the data records.

The subscriber identifier may be an International Mobile Subscriber Identity (IMSI). In one embodiment, the other information comprises a handset type identifier. The handset type identifier may be included within data relating to Wireless Application Protocol (WAP) or internet connection information in the data record.

Each mapping of a subscriber identifier with the other information may include information as to when the mapping was created or updated and the method may further include deleting any mappings that are older than a predetermined value.

In one embodiment, the table may be created with a plurality of predetermined mappings between subscriber identifiers and the other information.

The method may further comprise monitoring messages in the IP portion of the telecommunications network, and building data records based on the monitored messages.

The monitoring may occur on a Gn link of a General Packet Radio Service (GPRS) telecommunications network.

The data records may be Service Usage Records (SURs).

BRIEF DESCRIPTION OF THE DRAWINGS

One embodiment of the invention will now be more fully described, by way of example, with reference to the drawings, of which.

DETAILED DESCRIPTION

Figure 1:
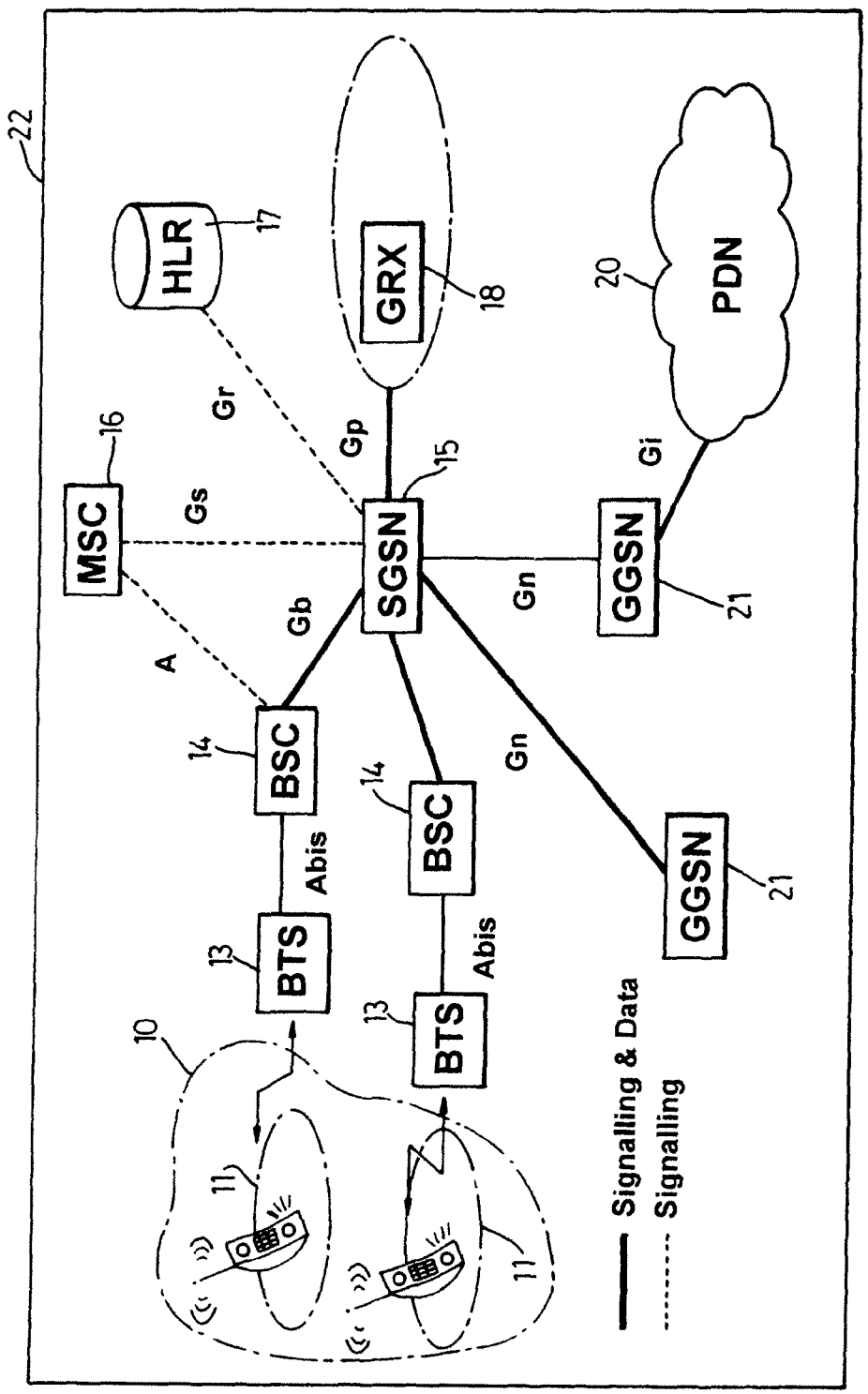
FIG. 1 shows a schematic diagram of a known GPRS network of the type that could usefully incorporate the present invention.
Figure 2:
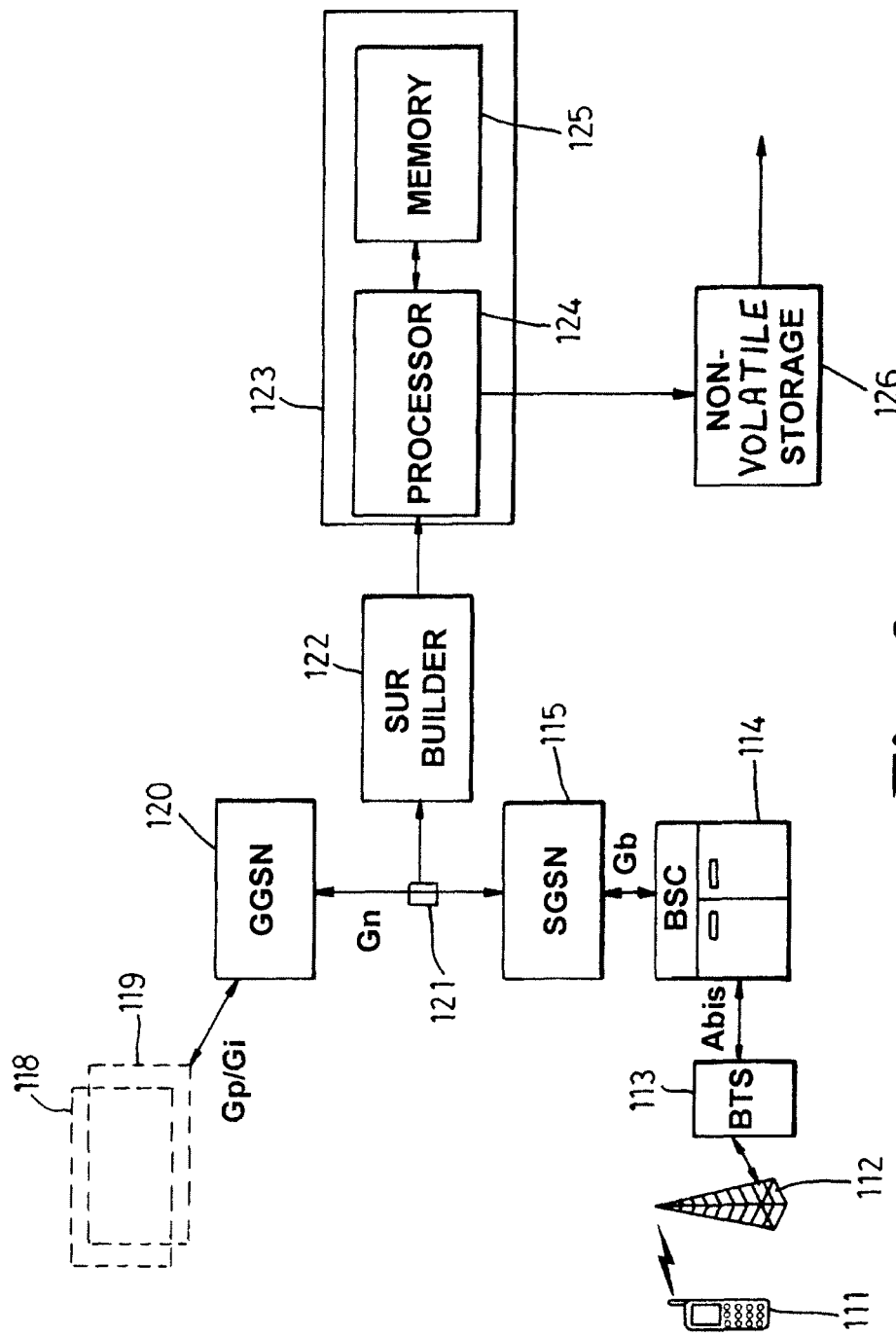
FIG. 2 shows a block diagram of part of the network of FIG. 1 incorporating an apparatus according to one embodiment of the present invention.

Thus, with reference, now, to FIG. 2, a GPRS network has a GGSN 120 coupled via links $G_p$ or $G_i$ to various other network entities, such as a PDN 118 or a GRX 119. The GGSN 120 is connected via link $G_n$ to an SGSN 115, which is connected via link $G_b$ to a BSC 114. The BSC 114 is, in turn, connected to a BTS 113, which communicates with an MS 111 via an antenna base station 112.

A monitoring probe 121 is arranged on link $G_n$ between the GGSN 120 and the SGSN 115. This monitoring probe 121 is coupled to provide information regarding the monitored messages to an SUR builder 122, where messages relating to the same call are correlated and a Service Usage Record (SUR) is built for each call. The SUR builder 122 may include a protocol analyzer to enable messages having different protocols, for example in different parts of the network, to be identified and still correlated with each other into a single SUR, as appropriate. The SUR builder is coupled to a record enrichment module 123, which is used to enrich the SURs, if appropriate.

The record enrichment module 123 includes a processor 124 and a memory 125 and takes the SURs from the SUR builder 122 and carries out the operations described below with reference to FIG. 3, before storing the SURs in a non-volatile memory 126. The record enrichment module 123 is used to try to enrich the SURs by adding handset type information to the SUR, if it is not already present. Although IMEI data is not available on the IP links, such as the $G_n$ link, when a handset requests a Wireless Application Protocol (WAP) connection, it transmits a User Agent string as part of the connection transaction. Part of the string identifies the handset make and model, and, of course, the IMSI will also be present as part of the connection request. As a result, handset type and IMSI information will be available in SURs relating specifically to WAP connects. It may also be present in other internet connection information.

Thus, the record enrichment module 123 can use the information from the SURs relating to WAP connects in order to gather IMSI versus handset type mappings and then store them to be used to enrich SURs that do not include handset type information. This results in an IMSI-handset type mapping table which is maintained dynamically, with new IMSI-handset type mappings being added or updated automatically. Old IMSI-handset type mappings can be aged out over a defined period of time.

Figure 3:
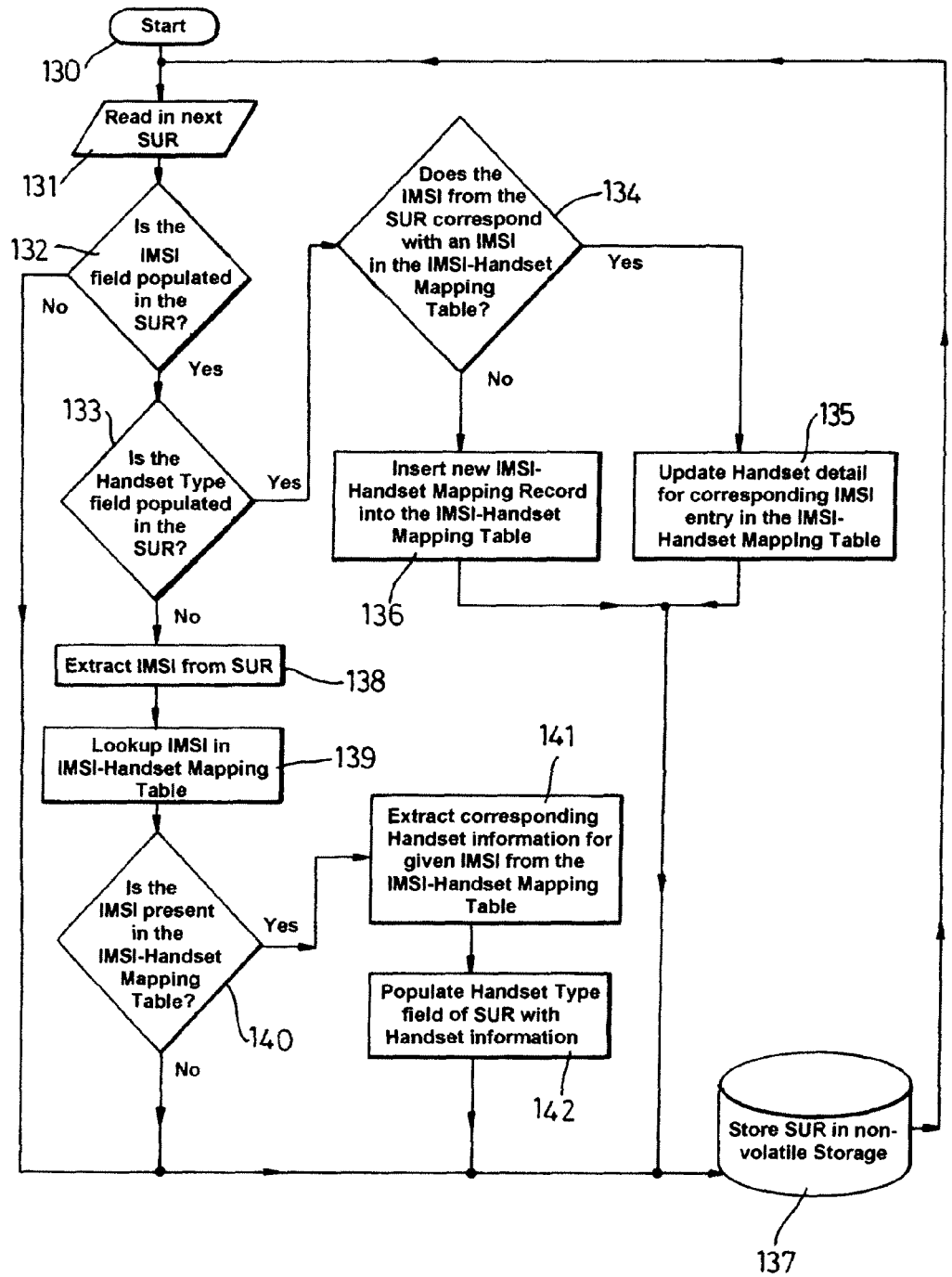
FIG. 3 shows a flow diagram of the operation of the apparatus of FIG. 2.

Referring now to FIG. 3, the record enrichment module 123 carries out the procedure beginning at the START 130. The module first reads in the next SUR from the SUR builder 122 at 131 and checks at 132 whether an IMSI field in the SUR is populated with an IMSI value for the particular SUR or not. If the IMSI value is missing from the SUR, then there is no more processing that can be performed with that particular SUR and it is stored in the non-volatile storage 137. If there is an IMSI value present for the SUR, then a check is made at 133 whether the Handset Type field is populated with a handset type value. If it is found that the SUR includes both an IMSI value and a handset type value, then the SUR does not need to be enriched, but the information mapping the IMSI value to the handset type value is kept for future reference. Thus, a table mapping IMSI values to handset type values stored in the memory 125 is checked at 134 to determine whether the IMSI value in the SUR corresponds to an IMSI value already stored in the table. If it is found that the IMSI value is already stored in the table, then, at 135, the handset type value from the SUR is used to update the table mapping the handset type value to the IMSI value. If, on the other hand, it is found that the IMSI value from the SUR is not yet stored in the table, then, at 136, the IMSI value is entered in the table and the corresponding handset type value is mapped into the table. After both alternatives, the table then includes an up to date mapping of the handset type value to the IMSI value and the SUR is then stored at 137 in the non-volatile memory 126.

If it is found at 133 that the SUR does not have a handset type value, then the IMSI value is extracted from the SUR at 138 and the IMSI value is checked in the table at 139 stored in memory 125 to determine at 140 whether it has already been stored in the table. If it is found in the table, then the corresponding handset type value mapped to that IMSI is extracted from the table at 141 and added to the SUR into the Handset Type field at 142. The enriched SUR is then stored in the non-volatile memory 126 at 137. If, on the other hand, it is found at 140 that the IMSI from the SUR is not present in the table, (and, of course, it has already been determined that the SUR does not include a handset type value) then the SUR cannot be enriched since the IMSI value is not known, and, for the same reason, the table itself cannot be updated, so the SUR is simply stored in the non-volatile memory 126 at 137.

In order to facilitate the creation of the table and its upkeep, it is possible to provide predetermined IMSI value to handset type value mappings to the record enrichment module 123. These can be provided in order to create the table in the first place and also to update it, if desired, if such information has been obtained from another source. In this case, the reference mappings are read by the record enrichment module 123 and either both the handset type and the IMSI values are entered into the table or, if the IMSI value is already present, the handset type value is updated.

In order to make sure that the table is not cluttered with mappings that are out of date and no longer of use, the record enrichment module 123 may also timestamp each mapping record when it is entered or updated and periodically check all mapping records to make sure that they are not older than some predetermined age. All those mapping records that are older may then be deleted. Additionally, or alternatively, a timestamp may also be applied to a mapping record whenever it is accessed to determine a handset type value for a particular IMSI and the mapping record may be retained even if it has not been updated for longer than the predetermined age, if it has been accessed in the meantime.

The SURs in the non-volatile memory 126 may be output to a Data Mining Toolkit or other data processing module for further processing and analysis as required.

It will be appreciated that although one particular embodiment of the invention has been described in detail, various modifications and improvements can be made by a person skilled in the art without departing from the scope of the present invention. For example, although it has been explained that the handset type information can be obtained from the User Agent string transmitted as part of a WAP connection request, it will be appreciated that such information may be available to the SUR builder from other data in messages monitored on IP links or elsewhere on the network. Similarly, although the invention has been described with reference to enriching the SURs with handset type information, it will be appreciated that an analogous procedure could be used for other information that may be available in some messages on the IP links or elsewhere, but that may not be present in all SURs.

It will further be appreciated, for example, that other embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

The invention claimed is:

1. An apparatus for enriching data records based on messages monitored on a telecommunications network having an Internet Protocol (IP) portion, the apparatus comprising:
    a data record enrichment module having an input for receiving first and second data records based on messages monitored on the IP portion of the network, the first and second data records including at least a subscriber identifier field and another information field relating to other information from the monitored messages, the data enrichment module including:
        a memory for storing a table constructed from values in the subscriber identifier field and the other information field of the received first data records, the table mapping subscriber identifiers with the other information; and
        a processor for checking whether a received second data record includes values in the subscriber identifier field and the other information field, wherein:
            if the received second data record includes both a subscriber identifier and the other information, the processor creates or updates a mapping between the subscriber identifier and the other information in the table and stores the received second data record, wherein each mapping of a subscriber identifier with the other information includes information as to when the mapping was created or updated and the processor deletes any mappings that are older than a predetermined value; and
            if the received second data record includes a subscriber identifier but does not include the other information, the processor checks the table for the other information mapped to the subscriber identifier and adds the corresponding other information, if it is present in the table, to the other information field in the received second data record and stores the received second data record.

2. An apparatus for enriching data records according to claim 1, wherein the subscriber identifier is an International Mobile Subscriber Identity (IMSI).

3. An apparatus for enriching data records according to claim 1, wherein the other information is a handset type identifier.

4. An apparatus for enriching data records according to claim 3, wherein the handset type identifier is included within data relating to Wireless Application Protocol (WAP) or internet connection information in the first data records.

5. An apparatus for enriching data records according to claim 1, wherein the table includes a plurality of predetermined mappings between subscriber identifiers and the other information.

6. An apparatus for enriching data records according to claim 1, wherein the first and second data records are Service Usage Records (SURs).

7. The apparatus of claim 1, further comprising:
    at least one probe for monitoring the messages in the IP portion of the telecommunications network; and
    a data record builder coupled to the at least one probe for building the first and second data records based on the monitored messages.

8. The apparatus according to claim 7, further comprising a non-volatile storage for storing the first and second data records.

9. The apparatus according to claim 7, wherein the at least one probe is located on a Gn link of a General Packet Radio Service (GPRS) telecommunications network.

10. A method of enriching data records based on messages monitored on a telecommunications network having an Internet Protocol (IP) portion, the method comprising:
   receiving first and second data records based on messages monitored on the IP portion of the network, the first and second data records including at least a subscriber identifier field and another information field relating to other information from the monitored messages;
   constructing a table from values in the subscriber identifier field and the other information field of the received first data records, the table mapping subscriber identifiers with the other information;
   checking whether a received second data record includes values in the subscriber identifier field and the other information field;
   if the received second data record includes both a subscriber identifier and the other information, creating or updating a mapping between the subscriber identifier and the other information in the table, wherein each mapping of a subscriber identifier with the other information includes information as to when the mapping was created or updated;
   deleting any mappings that are older than a predetermined value;
   if the received second data record includes a subscriber identifier but does not include the other information, checking the table for the other information mapped to the subscriber identifier and adding the corresponding other information, if it is present in the table, to the other information field in the second data record; and
   storing the second data records.

11. A method of enriching data records according to claim 10, wherein the subscriber identifier is an International Mobile Subscriber Identity (IMSI).

12. A method of enriching data records according to claim 10, wherein the other information is a handset type identifier.

13. A method of enriching data records according to claim 12, wherein the handset type identifier is included within data relating to Wireless Application Protocol (WAP) or internet connection information in the first data records.

14. A method of enriching data records according to claim 10, wherein the table includes a plurality of predetermined mappings between subscriber identifiers and the other information.

15. A method of enriching data records according to claim 10, wherein the first and second data records are Service Usage Records (SURs).

16. A method of enriching data records according to claim 10, further comprising:
   monitoring messages in the IP portion of the telecommunications network; and
   building the first and second data records based on the monitored messages.

17. A method of enriching data records according to claim 10, wherein the monitoring occurs on a Gn link of a General Packet Radio Service (GPRS) telecommunications network.

* * * * *